Patented July 17, 1923.

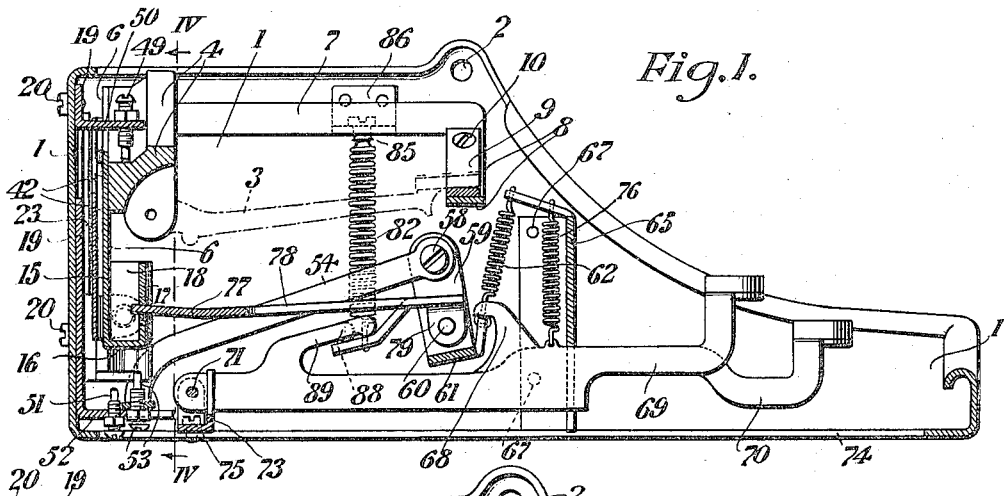
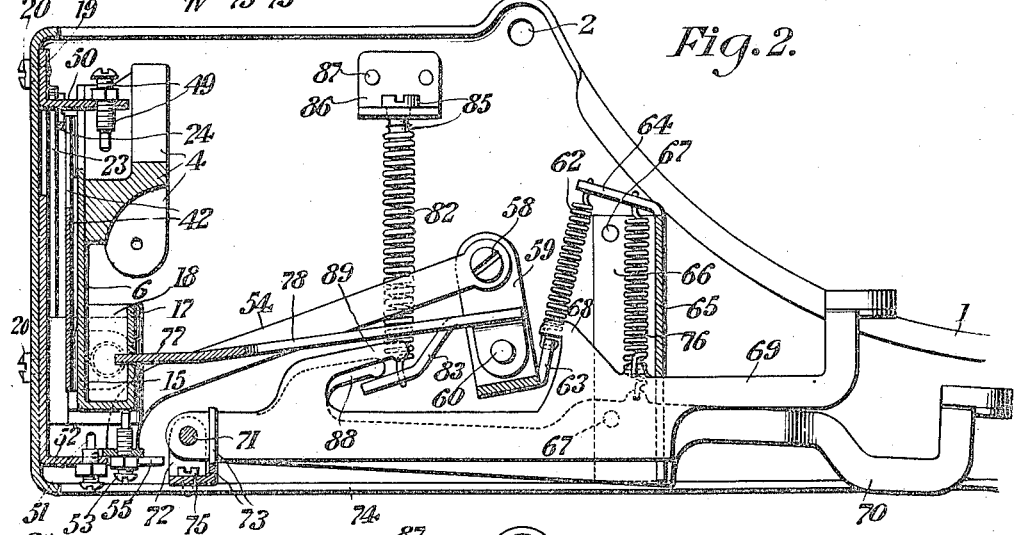
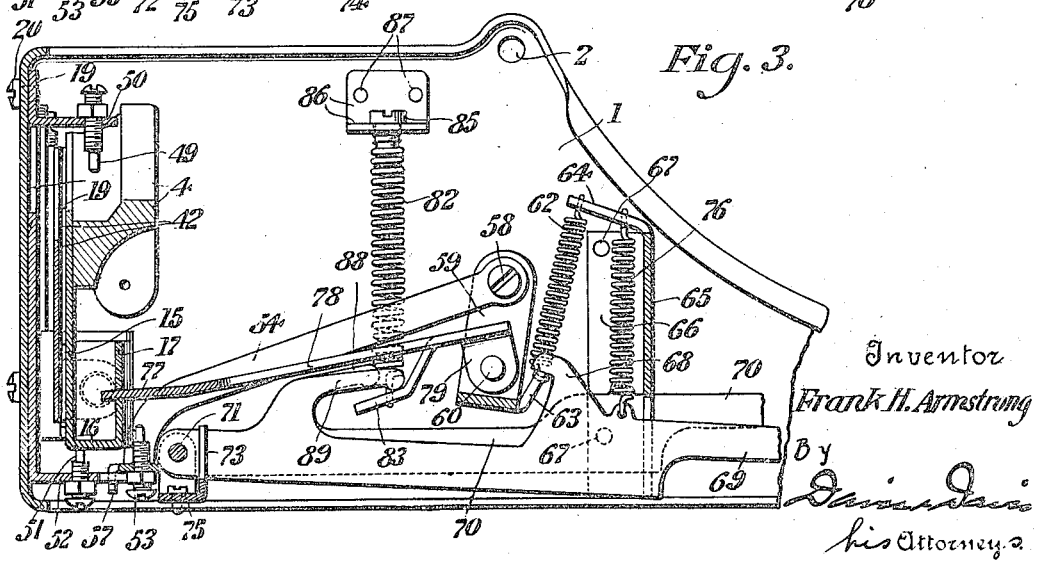

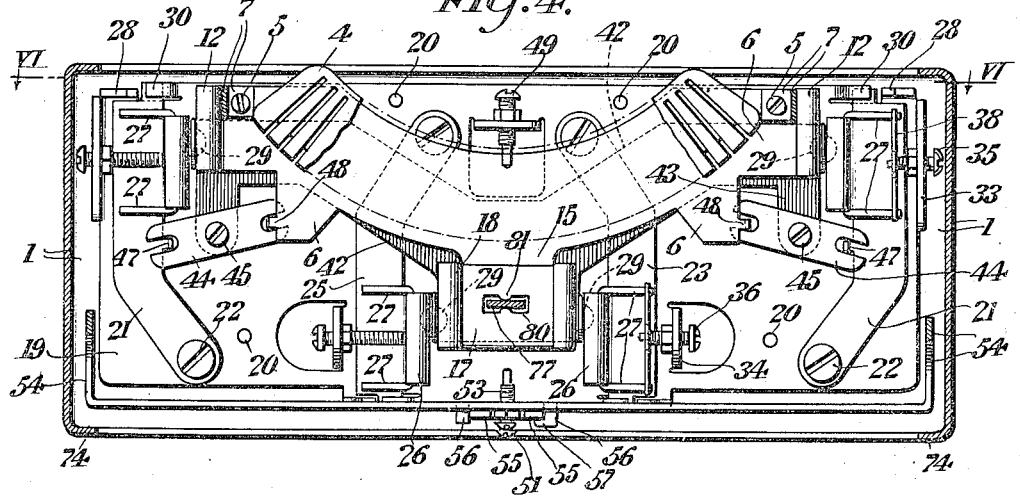
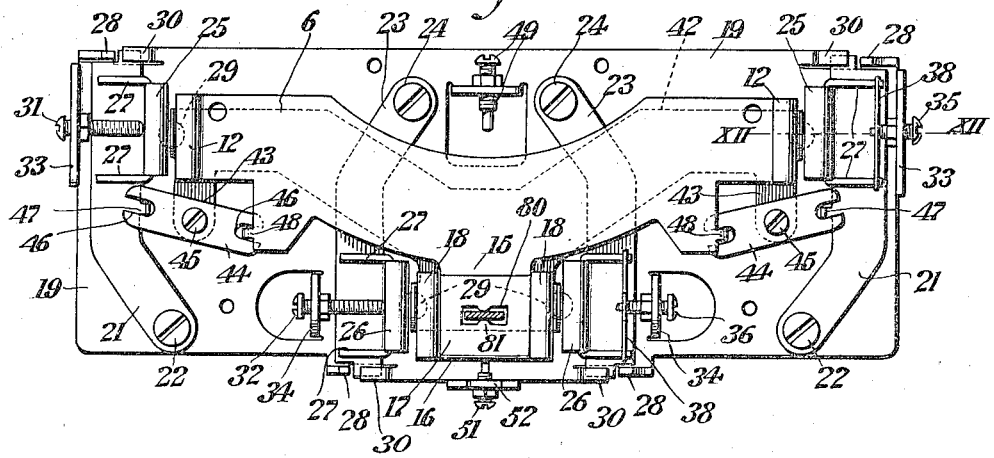
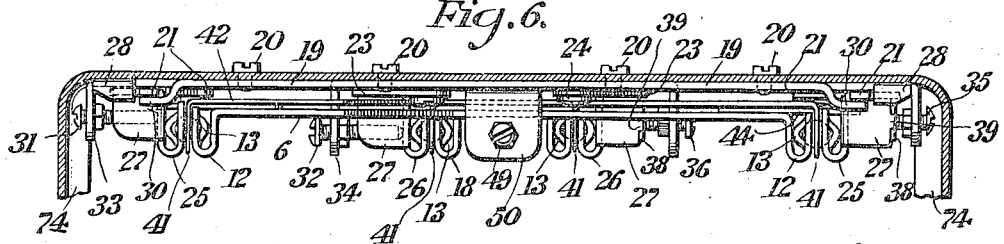

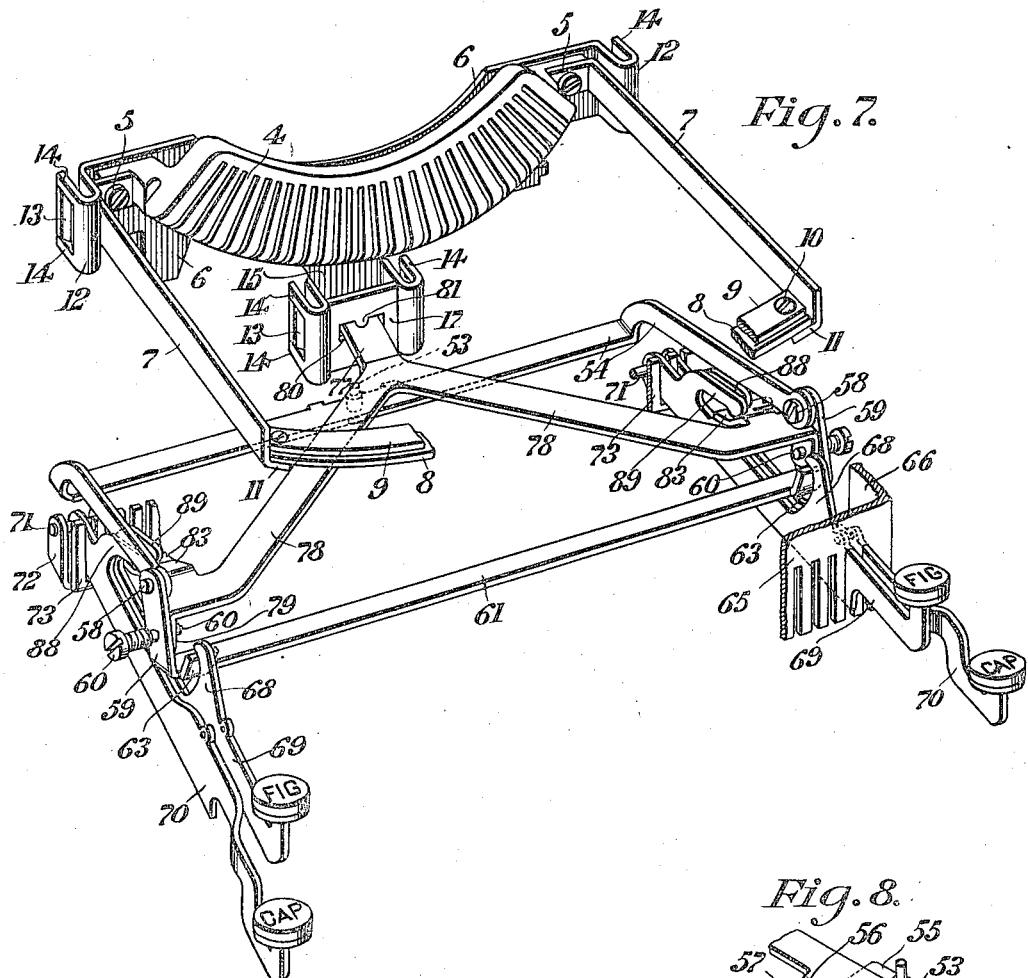
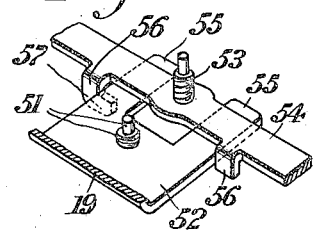
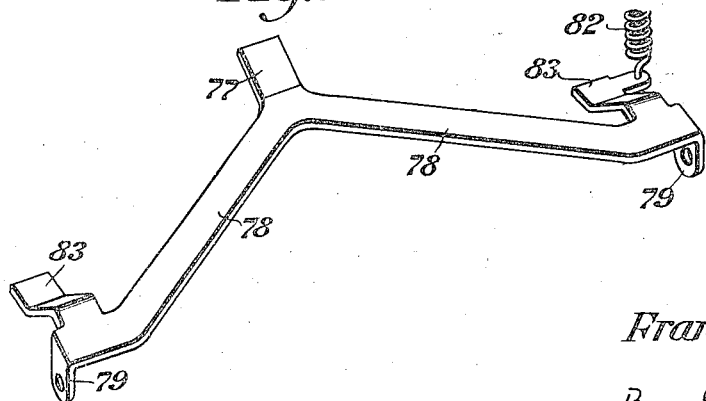

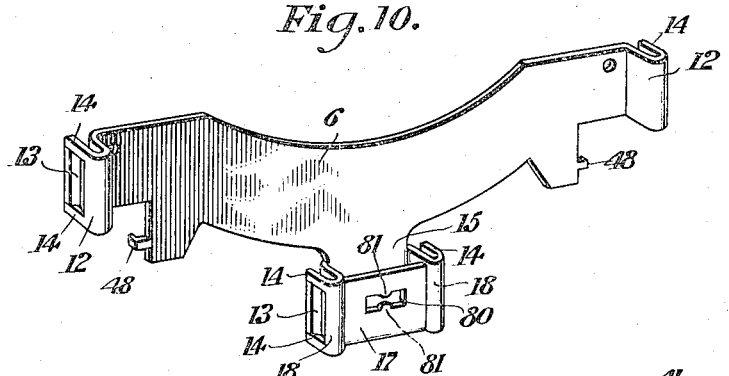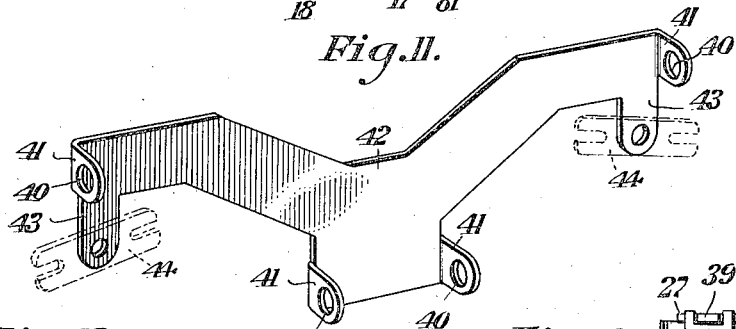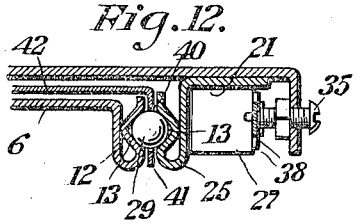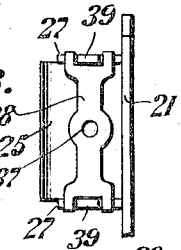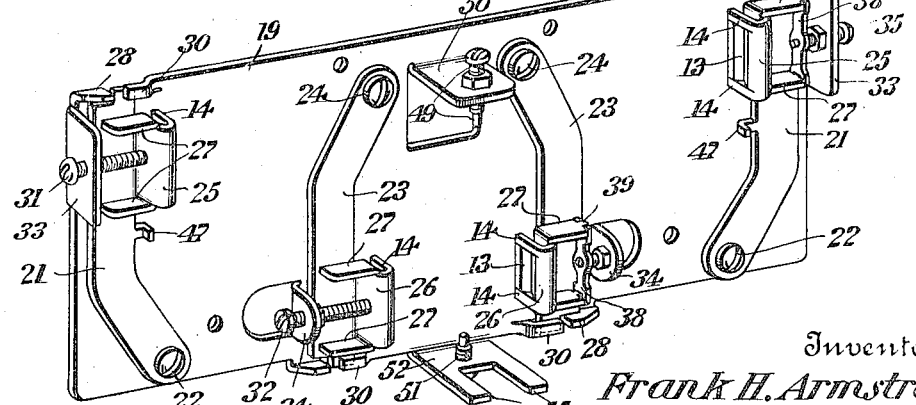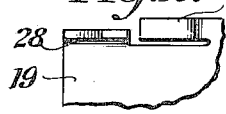

1,461,719

UNITED STATES PATENT OFFICE.

FRANK H. ARMSTRONG, OF AUBURN, NEW YORK, ASSIGNOR TO CORONA TYPEWRITER COMPANY, INC., OF GROTON, NEW YORK, A CORPORATION OF NEW YORK.

TYPEWRITING MACHINE.

Application filed February 12, 1921. Serial No. 444,448.

*To all whom it may concern:*

Be it known that I, FRANK H. ARMSTRONG, a citizen of the United States, and resident of Auburn, in the county of Cayuga and State of New York, have invented certain new and useful Improvements in Typewriting Machines, of which the following is a specification.

This invention relates to improvements in typewriting machines and has for its object to provide an improved case shift mechanism for such machines.

In the drawings:

Fig. 1 is a longitudinal sectional view of a typewriting machine provided with my improved case shift mechanism, those parts of the machine not necessary to show the construction and operation of the case shift mechanism being omitted;

Fig. 2 a view similar to Fig. 1 showing the parts in intermediate or Cap. shift position;

Fig. 3 a view similar to Fig. 1 showing the parts in Fig. shift position;

Fig. 4 a vertical transverse sectional view on the line IV—IV of Fig. 1, the parts being shown in normal position;

Fig. 5 a front elevation of the segment carrier and the antifriction supporting and guiding means therefor, these parts being shown in Fig. shift position;

Fig. 6 a horizontal section on the line VI—VI of Fig. 4, the type segment being omitted;

Fig. 7 a fragmentary perspective view showing parts of the case shift mechanism;

Fig. 8 a fragmentary perspective view showing the Cap. and Fig. shift stops, and parts of the members upon which the stops are mounted;

Fig. 9 a perspective view of the key-operated rocking member for raising and lowering the segment carrier;

Fig. 10 a perspective view of the segment carrier;

Fig. 11 a perspective view of the carrier or retainer for the ball bearings;

Fig. 12 a horizontal sectional view on the line XII—XII of Fig. 5;

Fig. 13 a side elevation of the upper end of the adjustable and spring-pressed raceway-carrying member at the right hand side of the machine;

Fig. 14 a perspective view of the detachable frame plate and the parts carried thereby; and Fig. 15 a fragmentary front elevation of a portion of the detachable frame plate.

I have shown the invention embodied in a small portable typewriting machine of the front strike type having a pressed steel main frame 1 to which a platen carriage support is adapted to be pivotally connected at 2, to permit the platen and carriage to be folded forwardly out of cooperative relation with the type-bars 3 to a compact position over the keyboard. It will be obvious, however, that the invention is not limited in its application to machines of this type, and it will also be understood that the invention may be embodied in a mechanism for shifting a platen as well as a type segment.

The type bar segment 4 is detachably held by a pair of screws 5 to a vertically shiftable sheet metal segment support or carrier 6. A pair of forwardly extending sheet metal bars 7 are also secured to the carrier by the screws 5, and support at their forward ends a downwardly bowed sheet metal bar 8 having a pad or cushion 9 on the upper side thereof upon which the heads of the type-bars normally rest. The bar 8 and the pad 9 are secured to the forward ends of the bars 7 by means of screws 10 passing therethrough and threaded into inwardly extending lugs 11 formed on the forward ends of the bars 7. The bars 7 and 8 and the pad 9 form a type-bar rest which partakes of the case shift movement of the type segment 4.

The segment carrier 6 is provided at its ends with integral raceway members formed by bending the ends of the carrier forwardly and then doubling the forwardly bent end portions of the carrier upon themselves by bending the same outwardly and rearwardly. The outer web of each doubled raceway member 12 is slotted horizontally adjacent its upper and lower edges and the metal between the slots is pressed inwardly against the inner web of the raceway member to form a ball channel 13 with stop lugs or fingers 14 at the upper and lower ends of the channel.

The side bars 7 of the type-bar rest engage the inner webs of the raceway members 12, as shown more clearly in Figs. 4 and 7 and serve to brace the raceway members. Midway its ends the segment carrier or support 6 is provided with a depending portion or stem 15 bent forwardly and then upwardly to form an abutment or foot 16 provided with an upstanding plate or flange 17 at its forward edge. A pair of doubled raceway members 18 are formed integrally with the stem 15, said raceway members being bent up from the side edges of the stem 15 and being provided with ball channels 13 and ball stop fingers 14. The raceway members 18 are braced by the upstanding plate or flange 17 on the foot 16.

A flat, rectangular, sheet metal frame plate 19 is detachably held to the back wall of the main frame of the machine by means of four screws 20. A pair of adjustable arms or raceway carriers 21 are pivotally held at their lower ends to the plate 19 by suitable shouldered pivot screws 22, and a second pair of adjustable arms or raceway carriers 23 are pivotally held at their upper ends to the plate 19 by means of shouldered pivot screws 24. The upstanding raceway carriers 21 are provided with raceway members 25 cooperating with the raceway members 12 on the segment carrier, said raceway members 25 being constructed in the same manner as the raceway members 12 and being bent up from the inner edges of the raceway carriers 21. The raceway carriers 23 are provided with raceway members 26 cooperating with the raceway members 18 on the segment carrier. Each of the raceway members 25 and 26 is provided with a pair of lugs 27 formed integrally with the upper and lower edges of the inner web of the doubled raceway members and having their rear edges bearing against the forward sides of the raceway carriers so as to brace the forwardly extending raceway members.

Four lugs 28 bent forwardly from the plate 19 adjacent the free ends of the raceway carriers or swinging arms 21 and 23 limit the outward swinging of said arms and prevent the raceway members 25 and 26 from moving far enough away from the raceway members 12 and 18 to permit the antifriction balls 29 to drop out of the raceways after the parts are assembled. Four lugs or retaining fingers 30, bent forwardly and then laterally outward from the frame plate 19, overlap the free ends of the swinging arms 21 and 23 and hold the same against forward movement relative to the plate 19.

The swinging arms 21 and 23 at the left hand side of the machine are independently adjustable by means of screws 31 and 32, respectively, threaded through lugs 33 and 34 formed integrally with plate 19 at the left side of the longitudinal center of the plate. The inner ends of the screws loosely engage the outer faces of the adjacent raceway members 25 and 26 and positively hold the same in their adjusted positions against movement toward the left side of the machine and away from their companion raceway members 12 and 18. The two swinging arms 21 and 23 at the right side of the machine are independently adjustable by means of screws 35 and 36 threaded through lugs 33 and 34 formed integrally with plate 19 at the right side of the longitudinal center of the plate. Screws 35 and 36 are provided with reduced inner end portions engaging in apertures 37 formed midway between the upper and lower ends of flat springs 38. The upper and lower ends of springs 38 are provided with notches in which the reduced outer end portions 39 of the lugs 27 engage, thus separably interlocking the springs with the lugs 27 on the adjacent raceway members 25 and 26.

In assembling the parts the screws 31 and 32 are first adjusted to position the left hand raceway members 25 and 26 to give the proper line of travel to the segment carrier 6. The screws 35 and 36 are then adjusted until all of the raceway members bear firmly against the antifriction balls 29 in the raceways with the springs 38 under tension. By adjusting the screws 35 and 36 until the springs 38 are under tension, it will be obvious that wear in the several raceways will be automatically taken up, and also that the pressure of the springs will swing the two right hand raceway members 25 and 26 towards the left side of the machine automatically, when necessary, to compensate for inequalities in the several raceways. It will also be obvious that the springs 38 will permit the raceway members 25 and 26 at the right hand side of the machine to move independently or simultaneously toward the right when necessary to compensate for inequalities in any of the four raceways, or to permit the balls 29 to pass obstructions caused by foreign matter collecting in the ball races. Suitable lock nuts are preferably threaded on the adjusting screws 31, 32, 35, and 36, as shown, to lock the screws in adjusted position.

Means are also provided for preventing creeping of the antifriction balls 29 in the raceways and for positively maintaining all of the antifriction balls in fixed relation with each other at all times. In the embodiment of the invention shown, the four ball races are comparatively short and a single ball 29 is confined in each of the four ball races. These four balls 29 engage loosely in eyes 40 formed in four forwardly extending lugs 41 on a sheet metal ball-retainer or carrier 42. The ball retainer 42 comprises an elongated, flat, sheet metal member or plate having two of the lugs 41 formed integrally therewith at opposite ends of the retainer, and the other two lugs formed integrally with the depending central portion of the retainer, said retainer conforming substantially with the shape of the type-segment carrier. The ball retainer 42 is located between the front face of plate 19 and the rear face of the segment carrier 6, and each of the lugs 41 projects forwardly between one pair of cooperating raceway members. The ball retainer 42 is provided, adjacent its opposite ends, with two depending lugs or arms 43, to the lower ends of which a pair of levers 44 are pivotally held by shouldered screws 45 or in any other suitable manner. The pivot screws 45 pass through the levers 44 midway the ends of said levers, and each of said levers is provided at its ends with longitudinally extending slots 46 in which lugs 47 formed on the swinging arms 21 and lugs 48 formed on the segment carrier 6 are loosely engaged. The lugs 48 extend rearwardly from the segment carrier 6 and the lugs 47 extend forwardly from the swinging arms 21, and said lugs pass through the slots 46 in the levers 44 at points equal distances from the pivot screws 45. With this arrangement, it will be obvious that the ball retainer will partake of the vertical movement of the segment carrier and will be positively moved half the distance of travel of the carrier by reason of its connection with the segment carrier and the arms 21. By connecting the ends of the levers 44 with lugs on the segment carrier 6 and the adjustable arms 21, it will be obvious that the relation between the pivot screws 45 and the connections of the levers 44 with the lugs 47 and 48 will be the same in all adjusted positions of the four swinging arms 21 and 23.

I have shown the invention embodied in a machine in which the type segment is shifted downwardly from a normal elevated position, in which the type bars are positioned for printing lower case characters, to either of two lower positions, in one of which the type bars are postioned to print capital letters and in the other of which the type bars are positioned to print figures or the like. The normal uppermost position of the segment is determined by an adjustable stop screw 49 threaded through a forwardly extending lug or shelf 50 on the detachable frame plate 19. The lowermost or "Fig. shift" position of the segment is determined by an adjustable stop screw 51 threaded through a forwardly extending shelf or bracket 52 carried by the plate 19. The two forwardly extending horizontal brackets or shelves 50 and 52 are preferably formed integrally with the sheet metal plate 19, as shown. The intermediate or "Cap shift" position of the segment is determined by an adjustable stop screw 53 threaded through the transverse bar of a U-shaped sheet metal stop-carrier 54. The stationary stop 51 is located directly under the foot 16 on the segment carrier 6 and the upper end of said stop is adapted to be engaged by said foot to arrest the downward movement of the type segment. The upper edge of he type segment is adapted to engage the lower end of the stationary stop screw 49 to arrest the upward movement of the type segment. Suitable lock nuts are preferably threaded on the three stop screws, as shown, to lock the stop screws in adjusted position.

The intermediate stop screw 53 mounted on the shiftable stop-carrier 54, is normally located directly under the foot 16 on the segment carrier and is shifted from beneath said foot when a "Fig. shift" key is operated. The transverse bar of the stop-carrier 54 is slidably supported on two lugs or arms 55 extending forwardly from the shelf 52, said transverse bar of the stop-carrier being provided with depending lugs 56 engaging the outer edges of said arms 55. One of the lugs 56 is provided with a lateral extension or hook end 57 engaging under one of the arms 55. This construction prevents the U-shaped stop-carrier from swinging upwardly away from the shelf 52 when the machine is tilted or jarred but permits the stop-carrier to reciprocate fore and aft the machine. The side arms of the U-shaped stop-carrier 54 are pivotally secured at their rear ends, by means of shouldered screws 58 or the like, to the upper ends of two levers 59. The levers 59 are pivotally supported intermediate their ends on shouldered screws 60 threaded through the side walls of the main frame 1 of the machine and having reduced inner end portions extending through apertures in the levers 59. The two levers 59 are rigidly connected together at their lower ends by a transverse bar 61, said levers and bar being made from a single piece of sheet metal and forming a bail-like member rockable about an axis extending transversely of the machine. The upper ends of the levers 59 are normally rocked rearwardly, to slide the intermediate stop 53 under the foot 16 on the segment carrier, by means of a coil spring 62 secured at its lower end to one of a pair of lugs 63 extending upwardly from the forward edge of the bar 61 at opposite ends of said bar. The upper end of the spring 62 is secured to a lug 64 extending rearwardly from the upper edge of a key lever guide comb 65. The side flanges 66 of the comb 65 are rigidly secured to the side walls of the main frame of the machine by screws 67. Upwardly extending hooks 68 are formed integrally with the two "Fig. shift" key levers 69, intermediate the ends of said key levers, and engage over the upper ends of the lugs 63 on the bar 61, so that when either "Fig. shift" key is depressed the bar 61 will be rocked rearwardly to cause the levers 59 to pull the stop carrier 54 forwardly and shift the intermediate stop 53 forwardly from beneath foot 16 and permit said foot and the segment carrier to move downwardly until the foot engages the stationary stop 51. A pair of "Cap. shift" key levers 70 are arranged at the outer sides of the two "Fig. shift" levers 69, and the two pairs of shift key levers 69 and 70 are fulcrumed on a rod 71 extending transversely of the machine and supported at its ends in upstanding lugs 72 formed on a rear key-lever guide-comb 73. The key-lever guide-comb 73 is L-shaped in cross section and the horizontal web thereof is secured to the flanges 74 on the side walls of the main frame 1 by means of screws 75. Both of the guide-combs 73 and 65 are provided with the usual vertical guide slots for the shift key levers 69 and 70 and the printing key levers (not shown). Each of the shift key levers 69 and 70 is normally rocked upwardly by a coil spring 76 until it engages the upper end of its guide slot in the comb 65. The return springs 76 are connected at their lower ends to the shift key levers and are secured at their upper ends to one of the lugs 64 formed at each end of the guide-comb 65. The "Fig. shift" key levers 69 and the hooks 68 thereon are thus arrested at a predetermined point in their return movement, and serve to limit the movement of the stop carrier 54 and levers 59 under the influence of the spring 62 and thereby determine the normal position of the intermediate stop 53.

The segment carrier 6 is shifted up and down through the medium of a forked lever having an arm 77 extending fore and aft of the machine and two arms 78 extending forwardly and laterally toward opposite sides of the machine from the forward end of the arm 77. The forked lever is pivotally held to the inner ends of the screws 60 which pass through down-turned ears 79 formed on the forward ends of the arms 78 of the lever. The rear end of the arm 77 of the forked lever extends through a horizontal slot 80 in the upstanding plate or flange 17 at the forward edge of the foot 16 on the segment carrier, thus forming a separably interlocked rocking or pivotal connection between the forked lever and the segment carrier. Two bosses 81 are preferably formed on the upper and lower edges of the slot 80, these bosses loosely engaging the upper and lower faces of the arm 77 of the forked lever. This arrangement reduces friction at this point. The slot 80 is wider transversely of the machine than the arm 77 of the lever, as more clearly shown in Figs. 4, 5 and 7 to permit relative lateral movement between the segment carrier and the arm 77 when the raceway members are adjusted, or when the segment carrier moves laterally owing to irregularities or obstructions in any of the raceways. The forked lever is normally rocked upwardly by means of a coiled spring 82 connected at its lower end to the rear end of one of a pair of rearwardly extending arms 83 formed integrally with the arms 78 of the forked lever and extending rearwardly at opposite sides of the machine from the forward ends of the arms 78, as more clearly shown in Fig. 9.

A tension adjusting screw 85 extends loosely through an angular sheet metal bracket 86 held to the right hand side wall of the main frame of the machine by screws 87, and is threaded into the upper end of the segment-carrier elevating spring 82. While I have shown only one spring for normally holding the segment and segment carrier in their uppermost position, it will be obvious that the spring 82, bracket 86, and adjusting screw 85 may be duplicated at the left hand side of the machine if desired. Power is applied to the forked lever, to pull the segment carrier and segment downwardly against the tension of the spring 82, through the medium of either of the four shift key levers. The two "Cap. shift" levers 70 are formed with forwardly extending tappets or arms 88 adjacent their rear ends, and the two "Fig. shift" levers 69 are formed with forwardly extending tappets or arms 89 adjacent their rear ends. The tappets 88 and 89 of the shift levers 70 and 69 at the left hand side of the machine loosely engage the upper face of the left hand arm 83 on the forked lever and the two tappets 88 and 89 on the right hand shift levers 70 and 69 engage over the right hand arm 83 on the forked lever. The tappets 89 on the "Fig. shift" levers are longer than the tappets 88 on the "Cap. shift" levers 70, so that the "Fig. shift" levers may rock the forked lever downwardly far enough to cause the foot 16 of the segment carrier to strike the stop 51 by the depression of a "Fig. shift" key to the same extent as that imparted to a "Cap. shift" key for moving the foot 16 into engagement with the stop 53.

As there is no connection between either of the "Cap. shift" key levers 70 and the bar 61 connecting the stop carrier operating levers 59, the intermediate stop 53 is not moved from beneath the foot 16 when either of the key levers 70 is operated. It will be obvious, therefore, that a depression of either of the "Cap. shift" keys on the levers 70 will cause the type segment to move downwardly until the foot 16 on the segment carrier strikes the upper end of the stop screw 53. When either of the "Fig. shift" keys on the shift levers 69 are operated, the bar 61 will be rocked rearwardly and cause the levers 59 to pull the U-shaped stop-carrier 54 forwardly out of the path of the foot 16 on the segment carrier so that the type segment may move downwardly until the foot 16 strikes the fixed stop 51.

By taking out the pivot screws 60, the forked segment-carrier-operating lever and the shiftable stop-carrier 54, with the intermediate stop mounted thereon, may be removed from the machine, since the stop carrier 54 has a separably interlocked sliding connection with the shelf 52 on the plate 19 and the forked lever has a separably interlocked rocking connection with the flange 17 on the foot 16 of the segment carrier. It will also be observed that the segment carrier, type segment, type rest, and all of the parts of the antifriction supporting and guiding means for the segment carrier, including the positively driven ball retainer 42, may be removed as a unit in assembled relation from the machine with the detachable frame plate 19 upon which all of these parts, as well as the two fixed case shift stops 49 and 51, are mounted.

What I claim is:

1. In a typewriting machine, the combination of a main frame, a support shiftable relatively to the main frame to vary the relation between printing instrumentalities and a platen and provided with a plurality of ball channels spaced apart transversely of the main frame, a frame part extending transversely of the main frame, a plurality of members shiftably held to said frame part and each provided with a ball channel cooperating with one of the channels on the support, means carried by said frame part for adjusting said members, balls in the raceways formed by the cooperating channels on the support and members, and means detachably holding said frame part to the main frame.

2. In a typewriting machine, the combination of a main frame, an upstanding sheet metal plate extending transversely of the main frame, means detachably holding said plate to the rear wall of the main frame, an upstanding vertically shiftable sheet metal support provided with outwardly facing ball channels, a type-bar segment on said support, a plurality of guide members adjustably held to said plate and each provided with an inwardly facing ball channel cooperating with one of the channels on the support, and balls in the raceways formed by the cooperating channels on the support and guide members.

3. In a typewriting machine, the combination of a sheet metal main frame, an upstanding sheet metal frame plate, means for detachably holding said frame plate against the rear wall of the main frame, an upstanding sheet metal type-bar segment supporting plate adjacent the front face of the frame plate, means carried by said plates forming four vertically extending raceways, and rolling elements in said raceways.

4. In a typewriting machine, the combination of a main frame, an upstanding sheet metal plate extending transversely of the main frame, means detachably holding said plate to the rear wall of the main frame, an upstanding vertically shiftable sheet metal support provided with outwardly facing ball channels, a type-bar segment on said support, a plurality of guide members adjustably held to said plate and each provided with an inwardly facing ball channel cooperating with one of the channels on the support, balls in the raceways formed by the cooperating channels on the support and guide members, a support shifting member pivotally mounted in the main frame to rock up and down, and key-operated means for rocking said support shifting member, said support having a transverse slot therein in which said support shifting member is loosely engaged.

5. In a typewriting machine, the combination of a main frame, a sheet metal frame plate detachably held to the main frame and extending transversely thereof in a vertical plane, an upstanding sheet metal type-bar segment supporting plate adjacent one face of said frame plate and provided with laterally bent portions formed with vertical ball channels, sheet metal guide members carried by said frame plate and each provided with a laterally bent portion formed with a ball channel, and balls in the raceways formed by the channels, whereby said frame plate, supporting plate, guide members and balls may be removed from or placed in the main frame as a unit while in assembled relation.

6. In a typewriting machine, the combination of a main frame, an upstanding frame plate detachably held to the frame and extending transversely thereof, a support shiftable relatively to the frame and plate to change case, means on the plate and support forming raceways, and rolling elements in the raceways, said support and rolling elements being removable with the frame plate from the main frame.

7. In a typewriting machine, the combination of a main frame, an upstanding frame plate detachably held to the frame and extending transversely thereof, a support shiftable relatively to the frame and plate to change case, means on the plate and support forming raceways, antifriction rolling elements in the raceways, and key-operated means for shifting the support having a separably interlocked pivotal connection with the support.

8. In a typewriting machine, the combination of a main frame, an upstanding frame plate detachably held to the frame and extending transversely thereof, a support shiftable relatively to the frame and plate to change case, means on the plate and support forming raceways, rolling elements in the raceways, a retainer connecting all of the rolling elements, and means for positively shifting the retainer when the support is shifted, all of said parts being removable as a unit from the main frame.

9. In a typewriting machine, the combination of a main frame, a support shiftable relatively to the main frame to change case and provided with raceway channels facing outwardly toward opposite sides of the main frame, members adjustably mounted at opposite sides of the main frame provided with inwardly facing raceway channels cooperating with the channels on the support to form ball races, antifriction balls in said races, means for rigidly holding one of said members in its adjusted position against outward movement, and means for yieldably holding the other member in its adjusted position.

10. In a typewriting machine, the combination of a main frame, a support shiftable relatively to the main frame to change case and provided with raceway channels facing outwardly toward opposite sides of the main frame, a pair of oppositely disposed members adjustable transversely of the machine and provided with inwardly facing raceway channels cooperating with the channels on the support to form ball races, balls in said races, means for holding one of said members in its adjusted position, and means for holding the other member in its adjusted position under spring pressure.

11. In a typewriting machine, the combination of a main frame, a support shiftable relatively to the main frame to change case and provided with raceway channels facing outwardly toward opposite sides of the main frame, a pair of oppositely disposed members pivotally mounted in the frame to swing transversely of the machine and provided with inwardly facing raceway channels co-operating with the channels on the support, adjustable means for positively holding one of said members against outward movement, and adjustable means exerting spring pressure on the other member tending to swing said member inwardly.

12. In a typewriting machine, the combination of a main frame, a support shiftable relatively to the frame to change case and provided with two laterally and vertically spaced raceway channels at both sides of the longitudinal center of frame, four members supported in the frame provided with raceway channels cooperating with the four channels on the support, spring means normally urging two of said members at one side of the longitudinal center of the machine toward the other two members.

13. In a typewriting machine, the combination of a main frame, a support shiftable relatively to the frame to change case and provided with two laterally and vertically spaced raceway channels at both sides of the longitudinal center of frame, four members supported in the frame provided with raceway channels cooperating with the four channels on the support, spring means normally urging two of said members at one side of the longitudinal center of the machine toward the other two members, and means for independently adjusting the other two members transversely of the machine and positively holding the same in their adjusted positions against outward movement.

14. In a typewriting machine, the combination of a main frame, a support shiftable vertically in the main frame to change case and provided at both sides of the longitudinal center of the machine with outwardly facing raceway channels, two upstanding transversely swinging arms pivotally supported at their lower ends in the frame at opposite sides of the longitudinal center of the machine, two depending transversely swinging arms pivotally supported at their upper ends in the frame at opposite sides of the longitudinal center of the machine, each of said arms being provided with an inwardly facing raceway channel, balls in the raceways formed by the channels on said support and arms, means for independently adjusting the upstanding and depending arms at one side of the machine, independent springs for pressing the upstanding and depending arms at the other side of the machine inwardly, and independent means for adjusting the tension of said springs.

15. In a typewriting machine, the combination of a support shiftable to change case, a plurality of anti-friction rolling elements on which said support travels, means for shifting the support, a retainer connecting all of said rolling elements, a pair of levers pivotally connected with said retainer intermediate their ends at points spaced apart transversely of the path of movement of the support, and means forming pivotal connections between the opposite ends of each lever and the shiftable support and a relatively stationary part of the machine 16. In a typewriting machine, the combination of a support shiftable to change case, guides, said support and guides being provided with channels cooperating to form raceways, rolling elements in the raceways, a retainer for all the rolling elements extending transversely between the guides, a pair of levers pivotally supported midway their ends on the retainer adjacent opposite ends of the retainer, means forming a pin-and-slot connection between one end of each lever and the support, means forming a pinand-slot connection between the opposite end of each lever and the adjacent guide, and means for shifting the support.

17. In a typewriting machine, the combination of a frame, a support shiftable to change case, means on the frame and support forming raceways, rolling elements in the raceways, a retainer for all of said rolling elements, and a lever pivotally connected with the support and frame and pivotally held to the retainer at a point midway between its points of connection with the support and frame.

18. In a typewriting machine, the combination of a support shiftable to change case and provided with raceway channels, adjustable members provided with raceway channels cooperating with the channels on the support, rolling elements in the raceways formed by said channels, a retainer for said rolling elements, a pair of levers pivotally connected intermediate their ends with the retainer, and means forming pin-and-slot connections between the opposite ends of each lever and the support and one of said adjustable members.

19. In a typewriting machine, the combination of a support shiftable vertically different distances in one direction to change case, a pair of shift keys operatively connected to shift the support, a horizontally slidable stop-carrier, a stationary frame part on which said carrier is slidably supported, means on the carrier cooperating with said frame part to restrain upward and lateral movements of the carrier, a stop on the carrier for arresting the support in its intermediate position, and connections between one of said keys and the stop-carrier for sliding the carrier horizontally on said frame part.

20. In a typewriting machine, the combination of a support shiftable to change case, a pair of key levers connected with the support for shifting the same different distances in the same direction, a stop for arresting the support when one of the key levers is operated, a slidably supported carrier for said stop, a lever fulcrumed intermediate its ends and pivotally connected at one end with the stop carrier, and means forming an operating connection between the other end of said lever and the other key lever.

21. In a typewriting machine, the combination of a main frame, a support shiftable to change case, a forked lever having one arm pivotally connected with said support and two forwardly and laterally extending arms pivotally supported at their forward ends in the frame, a spring connected with said forked lever for normally elevating the support, a pair of shift key levers having tappets overlying a part of said forked lever for rocking the lever downward different distances, a U-shaped slidably supported stop-carrier, a stop on the transverse member of the carrier for arresting the support at its minimum shifted position, a bail pivotally supported in the frame having side members pivotally connected at their upper ends with the side members of the stop-carrier, and a hook on one of said shift key levers engaging a part of the transverse member of the bail.

22. In a typewriting machine, the combination of a support shiftable to change case and provided with opposed raceway channels, opposed relatively shiftable guide members provided with raceway channels cooperating with the channels on the support, a spring connected at its ends with one of said guide members means adjustable toward and from the other guide member for pressing against said spring intermediate the ends of the spring and balls in the raceways formed by said ball channels.

23. In a typewriting machine the combination of a shiftable type-bar segment support provided with outwardly facing ball channels, a non-yieldable guide member at one side of said support provided with an inwardly facing ball channel, a pivotally supported guide member at the other side of the support adapted to swing transversely of the machine and provided with an inwardly facing ball channel, a spring connected at both ends with said swinging member, a screw threaded through a stationary part of the machine and pressing on the spring intermediate the ends of the spring, and balls in the raceways formed by the ball channels.

24. In a typewriting machine, the combination of a support shiftable to change case and provided with outwardly facing ball channels, a plurality of guide members provided with inwardly facing ball channels, balls in the raceways formed by the channels on the support and guide members, means pivotally supporting two of said guide members to swing transversely of the machine, independent springs each connected with a different one of said two pivoted guide members, and independently adjustable means for pressing against said springs to normally urge said two members in the same direction transversely of the machine under pressure.

25. In a typewriting machine, the combination of a support shiftable to change case and provided with oppositely facing ball channels, guide members pivotally supported to swing transversely of the machine and provided with ball channels cooperating with the channels on the support to form raceways, balls in the raceways, and means for independently adjusting each of said guide members.

26. In a typewriting machine, the combination of a support shiftable to change case and provided with outwardly facing ball channels, two pairs of pivotally supported guide members provided with inwardly facing ball channels, balls in the raceways formed by the channels, means for independently adjusting each guide member about its pivot, and yieldable means interposed between one pair of guide members and the adjusting means therefor.

27. In a typewriting machine, the combination of a support shiftable to change case and provided with outwardly facing ball channels at opposite sides thereof, two pairs of pivotally supported relatively yieldable guide members provided with inwardly facing ball channels, balls in the raceways formed by the channels, a transverse frame plate, means pivotally supporting said members at one end on the plate to swing transversely, means on the plate for guiding the free ends of said members, lugs on the plate, screws threaded through said lugs for holding the guide members against outward movement, and yieldable means interposed between certain of said guide members and the screws associated therewith.

In testimony whereof I hereunto affix my signature.

FRANK H. ARMSTRONG.